United States Patent
Sieffert et al.

(10) Patent No.: US 7,513,851 B2
(45) Date of Patent: Apr. 7, 2009

(54) TORQUE CONVERTER CLUTCH SLIP CONTROL

(75) Inventors: Jean Sieffert, Lingolsheim (FR); Regis Casteran, Strasbourg (FR)

(73) Assignee: GM Global Technology Operations, Inc., Detroit, MI (US)

( * ) Notice: Subject to any disclaimer, the term of this patent is extended or adjusted under 35 U.S.C. 154(b) by 397 days.

(21) Appl. No.: 11/515,518

(22) Filed: Sep. 1, 2006

(65) Prior Publication Data
US 2008/0058161 A1    Mar. 6, 2008

(51) Int. Cl.
*B60W 10/02* (2006.01)
(52) U.S. Cl. .............................. 477/176; 477/53; 477/61
(58) Field of Classification Search ................. 477/53, 477/61, 176, 180
See application file for complete search history.

(56) References Cited

U.S. PATENT DOCUMENTS

| | | | |
|---|---|---|---|
| 5,029,494 A * | 7/1991 | Lentz et al. ................. 477/148 |
| 5,721,682 A * | 2/1998 | Arai et al. ..................... 701/67 |
| 5,803,869 A * | 9/1998 | Jamzadeh et al. ........... 477/168 |
| 6,132,336 A * | 10/2000 | Adachi et al. ............... 477/169 |
| 6,139,472 A * | 10/2000 | Harada et al. ............... 477/169 |
| 6,199,450 B1 * | 3/2001 | Carlson et al. ............. 74/733.1 |
| 6,217,481 B1 * | 4/2001 | Watanabe et al. ........... 477/169 |
| 6,780,140 B2 * | 8/2004 | Okamoto et al. ............. 477/62 |

FOREIGN PATENT DOCUMENTS

JP    05141528 A  *  6/1993

* cited by examiner

*Primary Examiner*—Ha D. Ho

(57) ABSTRACT

A method and system for regulating engagement of a torque converter clutch (TCC) in a vehicle incorporating a transmission that is driven by an engine through a torque converter includes determining a non-linear slip profile based on vehicle operating parameters, calculating an actual TCC slip, calculating a TCC ramp pressure based on the non-linear slip profile and the actual TCC slip and regulating a TCC engagement pressure based on the TCC ramp pressure.

24 Claims, 4 Drawing Sheets

TORQUE CONVERTER CLUTCH SLIP CONTROL

FIELD

The present disclosure relates to a powertrain having a transmission driven by an internal combustion engine through a torque converter having a torque converter clutch (TCC), and more particularly to TCC slip control during an electronic clutch control (ECC) mode transition.

BACKGROUND

The statements in this section merely provide background information related to the present disclosure and may not constitute prior art.

Vehicle powertrains typically include a prime mover, such as an internal combustion engine, a transmission and a coupling device that transfers drive torque from the prime mover to the transmission. The transmission multiplies the drive torque by an applied gear ratio to drive the vehicle's drivetrain. Exemplary transmissions include an automatic transmission having fixed gear ratios and a continuously variable transmission (CVT) having infinitely variable gear ratios.

The coupling device often includes a torque converter that provides a fluid coupling between an output shaft of the prime mover and an input shaft of the transmission. As the output shaft accelerates, the input shaft is induced to accelerate through the fluid coupling. Once the input shaft speed is sufficiently near to the output shaft speed, a torque converter clutch (TCC) is engaged to provide a direct drive between the output shaft and the input shaft.

In some instances, an electronic clutch control (ECC) mode switches from Off to On, wherein engagement of the TCC is regulated. More specifically, clutch slip is regulated until the clutch is fully engaged or locked-up. Traditional control strategies implement a plurality of look-up tables, which are time-consuming and costly to regulate. Furthermore, traditional control strategies are not always transparent to the vehicle occupants, decreasing the drivability or drive feel.

SUMMARY

Accordingly, the present invention provides a method and system for regulating engagement of a torque converter clutch (TCC) in a vehicle incorporating a transmission that is driven by an engine through a torque converter. The method includes determining a slip profile based on vehicle operating parameters, calculating an actual TCC slip, calculating a TCC ramp pressure based on the slip profile and the actual TCC slip and regulating a TCC engagement pressure based on the TCC ramp pressure.

In another feature, the method further includes determining the TCC engagement pressure based on a base pressure and the TCC ramp pressure.

In another feature, the TCC ramp pressure is determined based on a TCC delta ramp pressure.

In still other features, the TCC ramp pressure is determined based on a slip delta correction term and a slip error correction term. The slip delta correction term is determined based on a vehicle operating parameter, a TCC slip target and a TCC slip reference. The TCC slip reference is a fixed value. The slip error correction term is determined based on a vehicle operating parameter and the actual TCC slip.

In yet another feature, the actual TCC slip is determined as a difference between an engine speed and a turbine speed of the torque converter.

The TCC slip control of the present invention generates a unique TCC slip profile as opposed to a fixed target. As a result, slip regulation of the TCC is more rapidly achieved and directly corresponds to the driving conditions. More specifically, the TCC slip profile improves vehicle drivability or feel in accordance with a transmission gear request, an engine torque and vehicle speed, and the transition of the ECC mode from Off to On is not noticeable by the vehicle occupants.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 2:
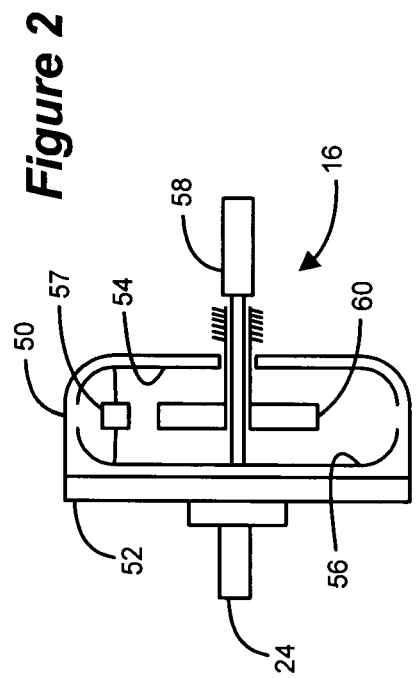
FIG. 2 is a schematic illustration of an exemplary torque converter implemented in the exemplary vehicle powertrain of FIG. 1.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
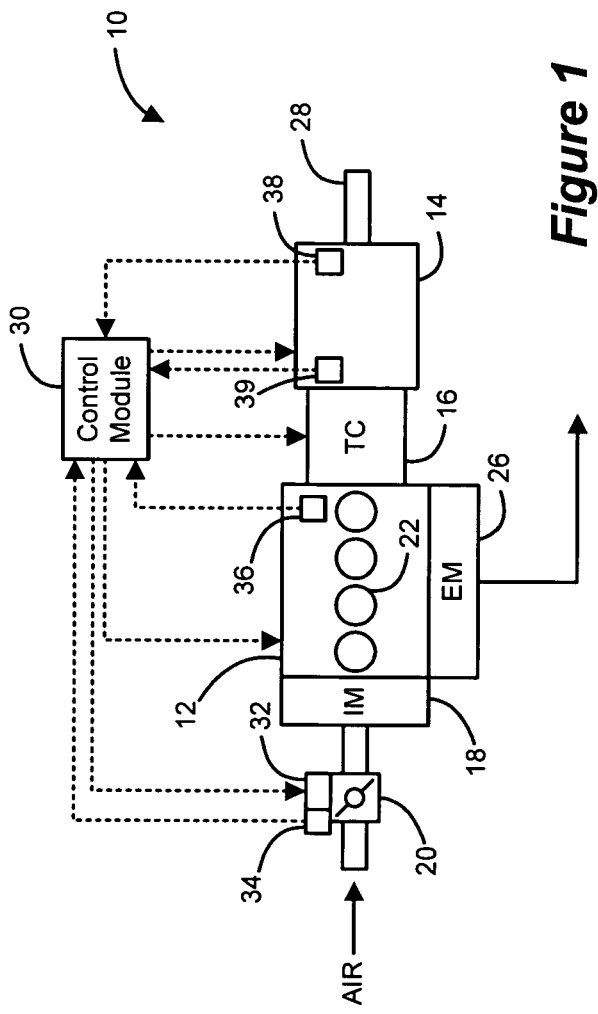
FIG. 1 is a functional block diagram of an exemplary vehicle powertrain that is regulated based on the torque converter clutch (TCC) slip control of the present disclosure.

Referring now to FIG. 1, an exemplary powertrain 10 is illustrated and includes an engine 12 that drives a transmission 14 through a coupling device 16. More specifically, air is drawn into an intake manifold 18 of the engine 12 through a throttle 20. The air is mixed with fuel and the air/fuel mixture is combusted within cylinders 22 to reciprocally drive pistons (not shown) within the cylinders 22. The pistons rotatably drive a crankshaft 24 (see FIG. 2) to provide drive torque. Exhaust generated by the combustion process is exhausted from the engine through an exhaust manifold 26. Although 4 cylinders are illustrated, it is appreciated that the present invention can be implemented in vehicles having any number of cylinders.

The drive torque drives is transferred through the torque converter 16 to drive the transmission 14. The transmission 14 multiplies the drive torque by a desired gear ratio to provide a modified drive torque. The modified drive torque is transferred to a vehicle driveline (not shown) by a transmission output shaft 28. The transmission 14 can include one of a manual transmission, an automatic transmission, an automated manual transmission and a continuously variable transmission (CVT). An automatic transmission includes a plurality of pre-defined, fixed gear ratios. A common CVT includes a belt and adjustable pulley system that enables an infinite variability between gear ratios without discrete steps or shifts.

A control module 30 regulates operation of the powertrain based on vehicle operating parameters. More specifically, the control module 30 regulates an effective throttle area ($A_{EFF}$) via a throttle actuator 32. A throttle position sensor 34 generates a throttle position signal (TPS) based on the angular position of the throttle 20. The control module 30 determines a requested engine torque ($T_{REQ}$) and adjusts the throttle position and other engine operating parameters to achieve $T_{REQ}$. The other engine operating parameters include, but are not limited to, a fueling rate, spark timing, a camshaft phase and/or an intake/exhaust valve lift or timing.

The control module 30 also regulates operation of the transmission 14 based on vehicle operating parameters. More specifically, a crankshaft position sensor 36 generates a crankshaft position signal, which is used to determine an actual engine speed ($RPM_{ENG}$). A transmission output shaft speed (TOSS) sensor 38 generates a TOSS signal, which is used to determine a vehicle speed ($V_{VEH}$), and a transmission input shaft speed (TISS) sensor 39 generates a TISS signal. The control module 30 adjusts a gear ratio of the transmission 14 based on the throttle position (i.e., TPS) and $V_{VEH}$. In an automatic transmission, the gear is shifted accordingly, and in a CVT, the pulley ratio is adjusted accordingly.

Referring now to FIG. 2, the coupling device 16 is illustrated as a torque converter that provides a fluid coupling between the engine 12 and the transmission 14. The torque converter 16 includes a housing 50 that is fixed for rotation with the crankshaft 24 via a flywheel 52. An impeller 54 is fixed for rotation with the housing 50 and a turbine 56 is fixed for rotation with a transmission input shaft 58. A stator 60 is also provided and is fixed from rotation. The interior of the torque converter 16 is filled with a viscous fluid. Rotation of the impeller 54 induces corresponding motion of the viscous fluid, which is directed towards the turbine 56 by the stator 60 to induce rotation of the turbine 56. The torque converter 16 includes a torque converter clutch (TCC) 57, which is selectively engaged to provide a direct drive between the crankshaft 24 and the input shaft 58.

As the crankshaft 24 rotates at an idle speed ($RPM_{IDLE}$), the impeller 54 is induced to rotate. $RPM_{IDLE}$, however, is normally insufficient to overcome braking forces that inhibit the turbine 56 from rotating. As the braking forces are reduced and/or $RPM_{ENG}$ increases, the impeller 54 drives the viscous fluid into the turbine 56 and the turbine 56 is induced to rotate. As a result, drive torque is transferred through the transmission 14 to propel the vehicle. Upon achieving a point where there is little or no RPM difference between the turbine 56 and impeller 54, the TCC is engaged to provide a direct drive between the engine 12 and the transmission 14. Under this condition, the rotational speed of the turbine 56 ($RPM_{TURB}$) is equal to $RPM_{ENG}$. Generally, $RPM_{TURB}$ is determined based on the TISS signal. The TCC slip ($\Delta RPM$) is determined as the difference between $RPM_{ENG}$ and $RPM_{TISS}$.

The TCC slip control of the present invention sets a TCC slip profile when transitioning the ECC from an OFF mode to an ON mode, and performs a closed-loop slip control around the slip profile. In this manner, the TCC slip is more rapidly regulated depending on driving conditions, vehicle drivability is enhanced and traditional calibration tables, which are time consuming and costly to develop per vehicle platform, can be forgone.

The TCC slip control of the present disclosure is implemented under conditions where the transmission 14 is in a static condition (i.e., is not shifting), and an initial $\Delta RPM$ error ($\Delta RPM_{ERROR}$) is inside of a range defined between a minimum value ($\Delta RPM_{ERRORMIN}$) and a maximum value ($\Delta RPM_{ERRORMAX}$). If these initialization conditions are true, a target $\Delta RPM$ ($\Delta RPM_{TARGET}$) profile is determined based on a turbine speed gradient that is calculated based on the TISS signal and the TCC slip. The TCC slip control performs a closed-loop control about the $\Delta RPM_{TARGET}$ profile, such that $\Delta RPM$ closely follows the profile.

A TCC engagement pressure ($P_{TCC}$) is calculated as the sum of a base TCC pressure ($P_{TCCBASE}$) and a TCC ramp pressure ($P_{TCCRAMP}$). $P_{TCCRAMP}$ is determined as the product of a delta ramp pressure ($\Delta P_{TCCRAMP}$) and a loop time ($t_{LOOP}$). $t_{LOOP}$ is the loop time (e.g., 25 ms) of the processor that performs the calculations described herein. $\Delta P_{TCCRAMP}$ is determined as the sum of a slip delta correction term ($\Delta RPM_{CORR}$) and $\Delta RPM_{ERROR}$ correction term ($\Delta RPM_{ERRORCORR}$). $\Delta RPM_{CORR}$ is determined from a look-up table as a function of $T_{ENG}$ and the difference between $\Delta RPM_{TARGET}$ and a reference $\Delta RPM$ value ($\Delta RPM_{REF}$). $\Delta RPM_{REF}$ is determined from a look-up table based on current transmission gear, $T_{ENG}$ and $RPM_{TURB}$. $\Delta RPM_{ERRORCORR}$ is determined the difference between $\Delta RPM$ (i.e., $RPM_{ENG}-RPM_{TURB}$) and $\Delta RPM_{TARGET}$.

Figure 3:
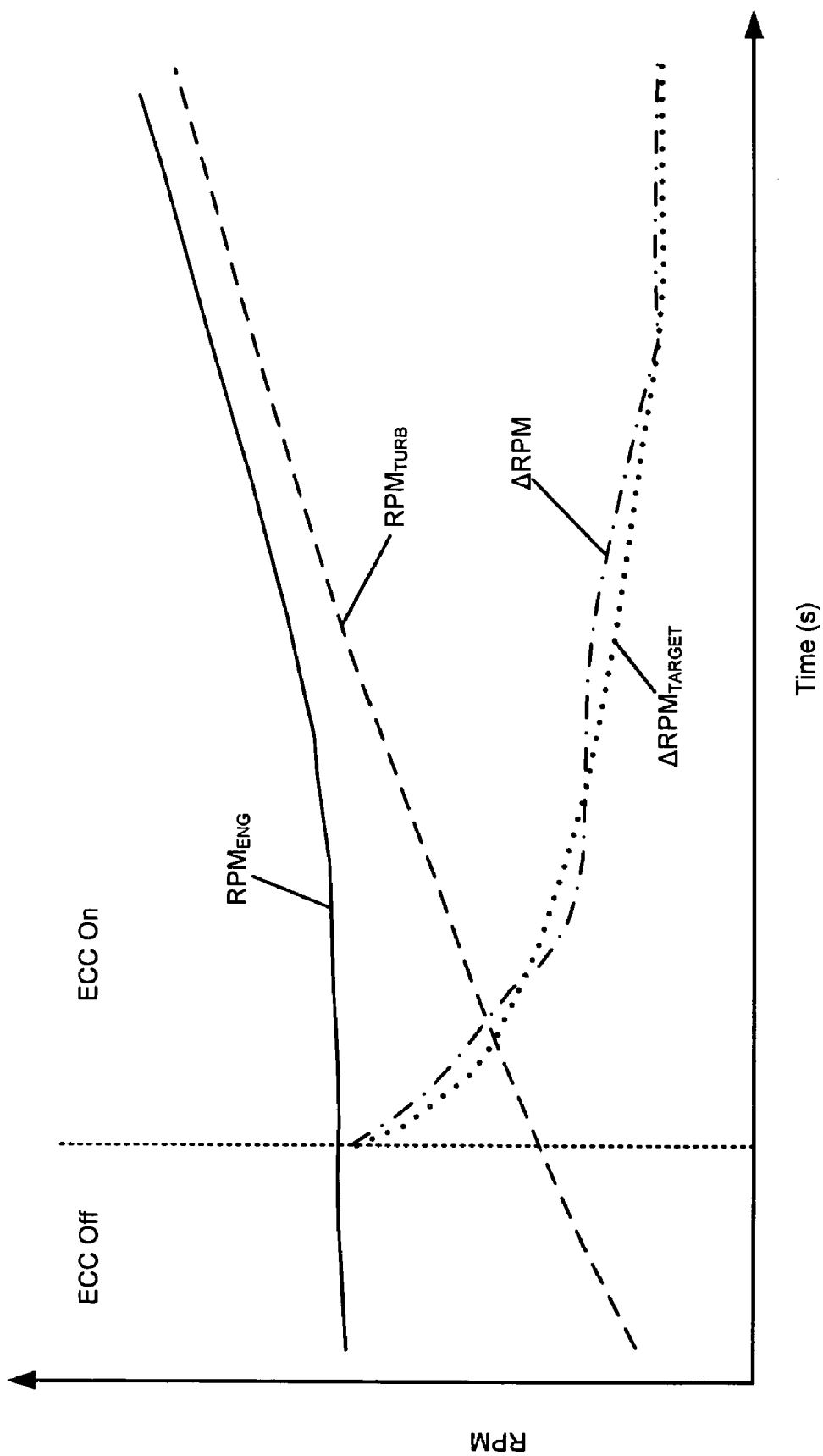
FIG. 3 is a graph illustrating exemplary operating parameter traces resulting from the TCC slip control.

Referring now to FIG. 3, the hydraulic system, which actuates engagement of the TCC is regulated based on $P_{TCC}$, calculated as described above, to achieve the desired TCC slip profile. Upon entering the ECC On mode, the TCC slip profile is determined based on the turbine speed gradient, calculated based on the TISS signal, and the TCC slip. Accordingly, the TCC slip profile is chosen from a plurality of possible TCC slip profiles. The TCC slip control of the present disclosure regulates engagement of the TCC such that $\Delta RPM$ shadows the TCC slip profile. Depending on a calibration value, the slip profile can be linear (i.e., constant slip reduction over time) or can be non-linear (i.e., cumulative effect).

Figure 4:
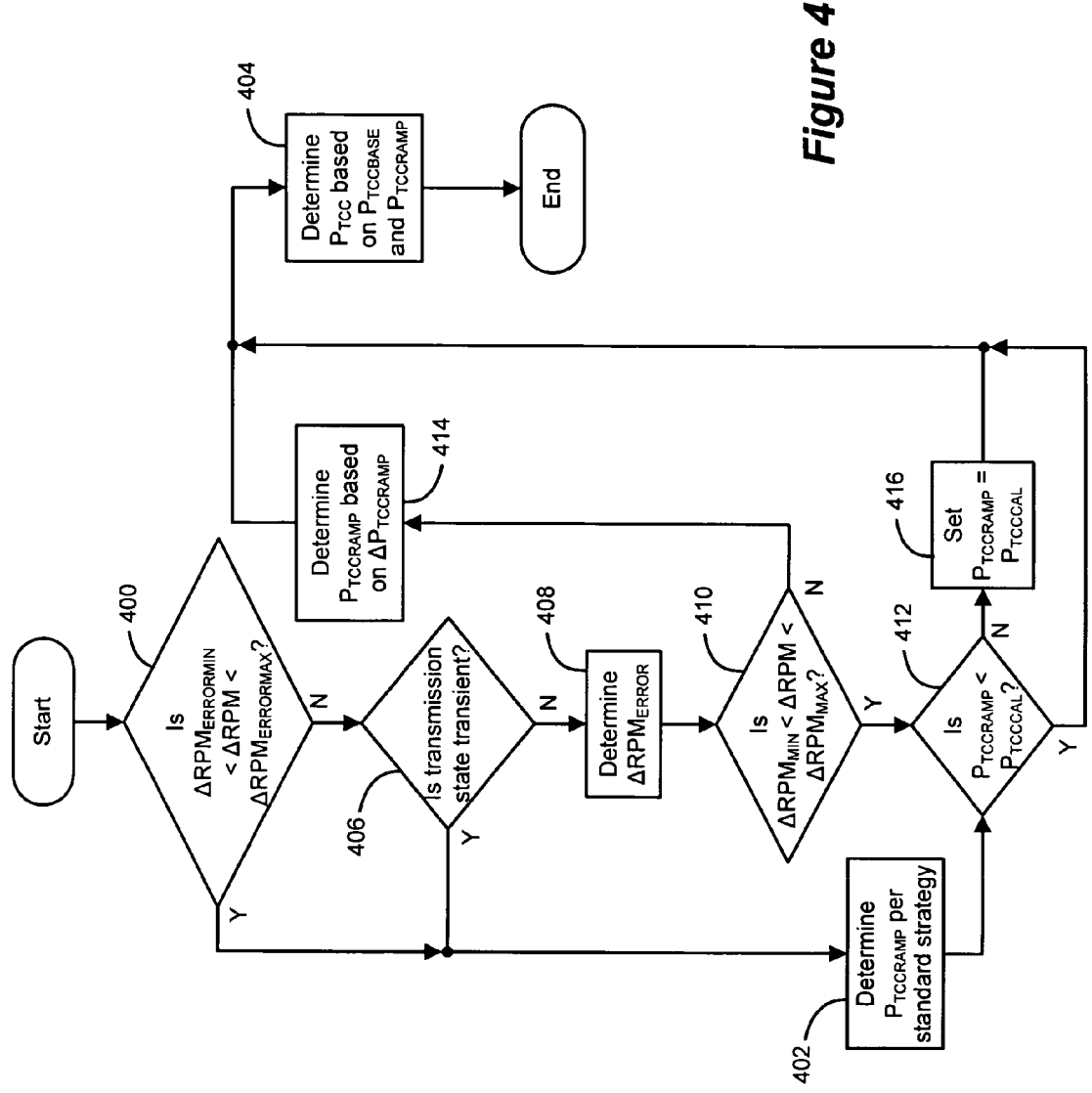
FIG. 4 is a flowchart illustrating exemplary steps executed by the TCC slip control.

Referring now to FIG. 4, exemplary steps that are executed by the TCC slip control will be described in detail. In step 400, control determines whether $\Delta RPM$ is inside of a range defined between a minimum value ($\Delta RPM_{ERRORMIN}$) and a maximum value ($\Delta RPM_{ERRORMAX}$). If these initialization conditions are true control continues in step 402. In step 402, control determines $P_{TCCRAMP}$ per a traditional strategy and continues in step 412. If $\Delta RPM$ is outside of a range defined between a minimum value ($\Delta RPM_{ERRORMIN}$) and a maximum value ($\Delta RPM_{ERRORMAX}$), control determines whether the current transmission state is transient (e.g., a shift is occurring) in step 406. If the transmission state is transient, control continues in step 402. If the transmission state is not transient, control continues in step 408.

In step 408, control determines $\Delta RPM_{ERROR}$. In step 410, control determines whether $\Delta RPM$ is within the range defined between $\Delta RPM_{MIN}$ and $\Delta RPM_{MAX}$. If $\Delta RPM$ is within the range, control continues in step 412. If $\Delta RPM$ is not within the range, control continues in step 414. In step 414, control determines $P_{TCCRAMP}$ based on $\Delta P_{TCCRAMP}$ and control continues in step 404. In step 404, control determines $P_{TCC}$ based on $P_{TCCBASE}$ and $P_{TCCRAMP}$ in step 404, and control ends.

In step 412, control determines whether $P_{TCCRAMP}$ is less than a calibrated value ($P_{TCCCAL}$). If $P_{TCCRAMP}$ is less than $P_{TCCCAL}$, control continues in step 404. If $P_{TCCRAMP}$ is not less than $P_{TCCCAL}$, control sets $P_{TCCRAMP}$ equal to $P_{TCCCAL}$ in step 416, and control continues in step 404.

Figure 5:
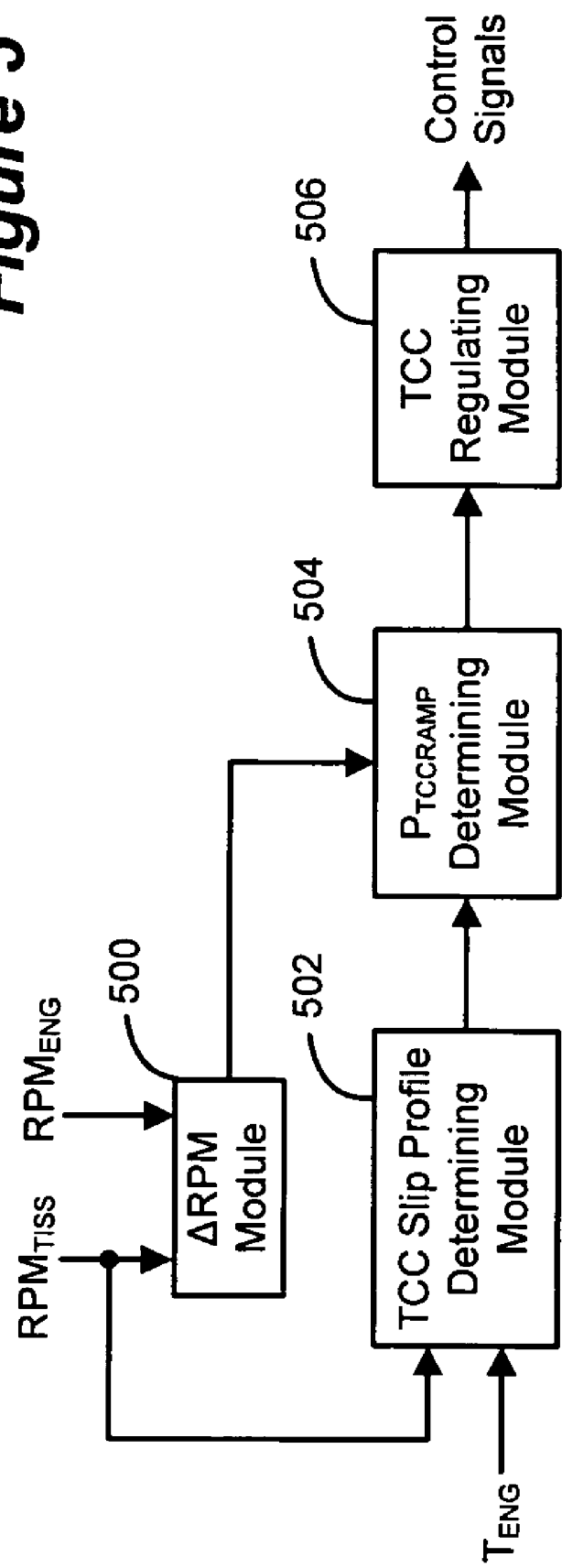
FIG. 5 is a functional block diagram of exemplary modules that execute the TCC slip control.

Referring now to FIG. 5, exemplary modules that execute the TCC slip control will be described in detail. The exemplary modules include, but are not limited to, a ΔRPM module 500, a TCC slip profile determining module 502, a $P_{TCCRAMP}$ determining module 504 and a TCC regulating module 506. The ΔRPM module 500 determines ΔRPM based on $RPM_{TISS}$ (i.e., $RPM_{TURB}$) and $RPM_{ENG}$. The TCC slip profile determining module 502 determines the TCC slip profile based on $RPM_{TISS}$ and $T_{ENG}$. The $P_{TCCRAMP}$ determining module 504 determines $P_{TCCRAMP}$ based on ΔRPM and the TCC slip profile. The TCC regulating module 506 determines $P_{TCC}$ based on $P_{TCCRAMP}$ and generates corresponding control signals to regulate engagement of the TCC.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of regulating engagement of a torque converter clutch (TCC) in a vehicle incorporating a transmission that is driven by an engine through a torque converter, comprising:
    determining a non-linear slip profile based on vehicle operating parameters;
    calculating an actual TCC slip;
    calculating a TCC ramp pressure based on said non-linear slip profile and said actual TCC slip; and
    regulating a TCC engagement pressure based on said TCC ramp pressure.

2. The method of claim 1 further comprising determining said TCC engagement pressure based on a base pressure and said TCC ramp pressure.

3. The method of claim 1 wherein said TCC ramp pressure is determined based on a TCC delta ramp pressure.

4. The method of claim 1 wherein said TCC ramp pressure is determined based on a slip delta correction term and a slip error correction term.

5. The method of claim 4 wherein said slip delta correction term is determined based on a vehicle operating parameter, a TCC slip target and a TCC slip reference.

6. The method of claim 5 wherein said TCC slip reference is a fixed value.

7. The method of claim 4 wherein said slip error correction term is determined based on a vehicle operating parameter and said actual TCC slip.

8. The method of claim 1 wherein said actual TCC slip is determined as a difference between an engine speed and a turbine speed of said torque converter.

9. A method of regulating engagement of a torque converter clutch (TCC) in a vehicle incorporating a transmission that is driven by an engine through a torque converter, comprising:
    initiating an electronic clutch control (ECC) on mode;
    determining an engine torque and a turbine speed of said torque converter;
    determining a non-linear slip profile based on said engine torque and said turbine speed;
    determining an actual TCC slip;
    calculating a TCC ramp pressure based on said non-linear slip profile and said actual TCC slip; and
    regulating a TCC engagement pressure based on said TCC ramp pressure.

10. The method of claim 9 further comprising determining said TCC engagement pressure based on a base pressure and said TCC ramp pressure.

11. The method of claim 9 wherein said TCC ramp pressure is determined based on a TCC delta ramp pressure.

12. The method of claim 9 wherein said TCC ramp pressure is determined based on a slip delta correction term and a slip error correction term.

13. The method of claim 12 wherein said slip delta correction term is determined based on said engine torque, a TCC slip target and a TCC slip reference.

14. The method of claim 13 wherein said TCC slip reference is a fixed value.

15. The method of claim 12 wherein said slip error correction term is determined based on said engine torque and said actual TCC slip.

16. The method of claim 9 wherein said actual TCC slip is determined as a difference between an engine speed and said turbine speed.

17. A torque converter clutch (TCC) regulation system in a vehicle incorporating a transmission that is driven by an engine through a torque converter, comprising:
    a first module that determines a non-linear slip profile based on vehicle operating parameters;
    a second module that calculating an actual TCC slip;
    a third module that calculates a TCC ramp pressure based on said non-linear slip profile and said actual TCC slip; and
    a fourth module that regulates a TCC engagement pressure based on said TCC ramp pressure.

18. The TCC regulation system of claim 17 wherein said third module determines said TCC engagement pressure based on a base pressure and said TCC ramp pressure.

19. The TCC regulation system of claim 17 wherein said TCC ramp pressure is determined based on a TCC delta ramp pressure.

20. The TCC regulation system of claim 17 wherein said TCC ramp pressure is determined based on a slip delta correction term and a slip error correction term.

21. The TCC regulation system of claim 20 wherein said slip delta correction term is determined based on a vehicle operating parameter, a TCC slip target and a TCC slip reference.

22. The TCC regulation system of claim 21 wherein said TCC slip reference is a fixed value.

23. The TCC regulation system of claim 20 wherein said slip error correction term is determined based on a vehicle operating parameter and said actual TCC slip.

24. The TCC regulation system of claim 17 wherein said actual TCC slip is determined as a difference between an engine speed and a turbine speed of said torque converter.

* * * * *